US012705709B2

(12) United States Patent
Fang

(10) Patent No.: US 12,705,709 B2
(45) Date of Patent: Aug. 11, 2026

(54) METHOD AND DEVICE FOR GENERATING ALL-IN-FOCUS IMAGE

(71) Applicant: Samsung Electronics Co., Ltd., Suwon-si (KR)

(72) Inventor: Jingyu Fang, Suzhou Industrial Park (CN)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 602 days.

(21) Appl. No.: 17/954,871

(22) Filed: Sep. 28, 2022

(65) Prior Publication Data

US 2024/0020798 A1 Jan. 18, 2024

(30) Foreign Application Priority Data

Jul. 14, 2022 (CN) ........................ 202210833722.X

(51) Int. Cl.

| | |
|---|---|
| ***G06T 5/00*** | (2024.01) |
| ***G06T 3/40*** | (2024.01) |
| ***G06T 5/20*** | (2006.01) |
| ***G06T 5/50*** | (2006.01) |
| ***G06T 5/73*** | (2024.01) |

(52) U.S. Cl.

CPC .................. *G06T 5/73* (2024.01); *G06T 3/40* (2013.01); *G06T 5/20* (2013.01); *G06T 5/50* (2013.01); *G06T 2207/10028* (2013.01)

(58) Field of Classification Search

CPC ... G06T 5/73; G06T 2207/10148; G06T 3/40; G06T 5/50; G06T 2207/10028

See application file for complete search history.

(56) References Cited

U.S. PATENT DOCUMENTS

| | | | | |
|---|---|---|---|---|
| 9,292,926 | B1 * | 3/2016 | Tang .................... | H04N 13/128 |
| 9,344,619 | B2 | 5/2016 | Shroff et al. | |
| 9,420,164 | B1 | 8/2016 | Galor Gluskin et al. | |
| 10,477,187 | B2 | 11/2019 | Emberger et al. | |

(Continued)

FOREIGN PATENT DOCUMENTS

| | | |
|---|---|---|
| CN | 102663721 A | 9/2012 |
| CN | 107798658 A | 3/2018 |

(Continued)

OTHER PUBLICATIONS

Nikon https://web.archive.org/web/20131112195552/http://www.nikon.com/about/technology/rd/core/software/caf/index.htm (Year: 2013).*

(Continued)

*Primary Examiner* — Sumati Lefkowitz
*Assistant Examiner* — Wayne Zhang
(74) *Attorney, Agent, or Firm* — HARNESS, DICKEY & PIERCE, P.L.C.

(57) ABSTRACT

A method and device for generating an all-in-focus image are disclosed. A method of generating an all-in-focus image includes obtaining a scene image and a phase detection image by capturing a scene using a phase detection image sensor; determining a blur kernel based on the phase detection image and a particular mapping relationship indicating a depth and a blur kernel distribution; and generating the all-in-focus image by deblurring the scene image using the blur kernel.

12 Claims, 8 Drawing Sheets

(56) References Cited

U.S. PATENT DOCUMENTS

| | | | | |
|---|---|---|---|---|
| 2012/0200725 | A1* | 8/2012 | Albu | H04N 23/673 348/222.1 |
| 2013/0113962 | A1* | 5/2013 | Li | H04N 5/2621 348/240.2 |
| 2015/0172547 | A1* | 6/2015 | Wang | H04N 23/683 348/208.4 |
| 2020/0221064 | A1 | 7/2020 | Yerushalmy et al. | |
| 2021/0097659 | A1* | 4/2021 | Hung | H04N 23/676 |
| 2023/0012208 | A1* | 1/2023 | Nakamura | H04N 23/959 |

FOREIGN PATENT DOCUMENTS

| | | | |
|---|---|---|---|
| CN | 110400340 | A | 11/2019 |
| CN | 111275625 | A | 6/2020 |
| WO | WO-2020/087015 | A1 | 4/2020 |
| WO | 2021-004262 | A1 | 1/2021 |

OTHER PUBLICATIONS

Chinese Office Action dated Apr. 1, 2025 for Corresponding Chinese Patent Application No. 202210833722.X.

* cited by examiner

METHOD AND DEVICE FOR GENERATING ALL-IN-FOCUS IMAGE

CROSS-REFERENCE TO RELATED APPLICATION

This application claims the benefit of Chinese Patent Application No. 202210833722.X, filed on Jul. 14, 2022 in the Chinese Intellectual Property Office, the disclosure of which is incorporated herein in its entirety by reference.

BACKGROUND

Field

The present inventive concepts relate to image processing, more particularly, to methods and devices for generating an all-in-focus image.

Related Art

Clear imaging of each detail of a target object may be realized through an all-in-focus imaging during a camera imaging so as to obtain an all-in-focus image with clear details. Since the all-in-focus image may provide clear details of the target object to a user and/or a terminal, the all-in-focus image may satisfy various demands of the user and/or the terminal.

Generally, the all-in-focus image may be generated through the following method: collecting images with different focusing distances by scan focusing; after an image sequence is preprocessed for registration and alignment, detecting image areas with the clearest imaging at different focusing distances using a sharpness operator, wherein a clear area in one image indicate that an object in the area is within the range of a depth of field of the focusing distance of the image; finally extracting and merging clear areas in the image sequence to generate an all-in-focus image.

However, in the above method of generating an all-in-focus image, the captured object needs to remain relatively stationary in the process of scanning and capturing multi-frame images, an all-in-focus image of a moving object cannot be captured, and the process of capturing and generating pictures takes a long time.

SUMMARY

The contents of the present inventive concepts are provided to introduce the selection of conceptions further described in some example embodiments in a simplified form. The contents of the present inventive concepts do not aim at identifying key features or essential features of a subject matter which claims rights, nor do they aim at assisting to determine a scope of a subject matter which claims rights.

Methods and devices for generating an all-in-focus image are provided.

In some example embodiments, a method of generating an all-in-focus image is provided and may include obtaining a scene image and a phase detection image based on capturing a scene using a phase detection image sensor; determining a blur kernel based on the phase detection image and a particular (or, alternatively, pre-established or stored) mapping relationship indicating a depth and a blur kernel distribution; and generating the all-in-focus image by deblurring the scene image using the blur kernel.

In some example embodiments, the scene image may be obtained by pixels for sensing light intensity of the phase detection image sensor, and the phase detection image is obtained by phase detection pixels of the phase detection image sensor.

In some example embodiments, the phase detection image may include a depth image and a confidence image corresponding to the depth image, and wherein the determining the blur kernel may include: refining the depth image based on the confidence image to refine a depth value with a confidence lower than a threshold in the depth image; and determining the blur kernel based on the refined depth image and the mapping relationship.

In some example embodiments, the determining a blur kernel based on the refined depth image and the mapping relationship may include: generating a depth image having a resolution of the scene image based on upscaling the refined depth image; and determining the blur kernel based on the depth image having the resolution of the scene image and the mapping relationship.

In some example embodiments, the generating the all-in-focus image may include: deblurring the scene image based on applying the blur kernel to a particular (or, alternatively, predetermined) blur kernel convolution model to generate the all-in-focus image.

In some example embodiments, the mapping relationship is established (e.g., pre-established) based on: obtaining a blur kernel images based on images of a point source collected by the phase detection image sensor at different depths; and establishing the mapping relationship indicating the depth and the blur kernel distribution by interpolating the blur kernel images or fitting the blur kernel images.

In some example embodiments, a device for generating an all-in-focus image is provided and may include a memory storing executable instructions and a processor that is configured to execute the executable instructions to cause the processor to obtain a scene image and a phase detection image based on capturing a scene using a phase detection image sensor; determine a blur kernel based on the phase detection image and a pre-established mapping relationship indicating a depth and a blur kernel distribution; and generate the all-in-focus image based on deblurring the scene image using the blur kernel.

In some example embodiments, the scene image may be obtained by pixels for sensing light intensity of the phase detection image sensor, and the phase detection image may be obtained by phase detection pixels of the phase detection image sensor.

The phase detection image may include a depth image and a confidence image corresponding to the depth image, and wherein the processor may be configured to execute the executable instructions to refine the depth image based on the confidence image to refine a depth value with a confidence lower than a threshold in the depth image; and determine the blur kernel based on the refined depth image and the mapping relationship.

In some example embodiments, the processor may be configured to execute the executable instructions to: generate the depth image having a resolution of the scene image based on upscaling the refined depth image; and determine the blur kernel based on the depth image having a resolution of the scene image and the mapping relationship.

In some example embodiments, the processor may be configured to execute the executable instructions to: deblur the scene image based on applying the blur kernel to a particular (or, alternatively, predetermined) blur kernel convolution model to generate the all-in-focus image.

In some example embodiments, the mapping relationship may be established (e.g., is pre-established) based on: obtaining blur kernel images based on images of a point source collected by the phase detection image sensor at different depths; and establishing the mapping relationship indicating the depth and the blur kernel distribution based on interpolating the blur kernel images or fitting the blur kernel images.

Figure 1:
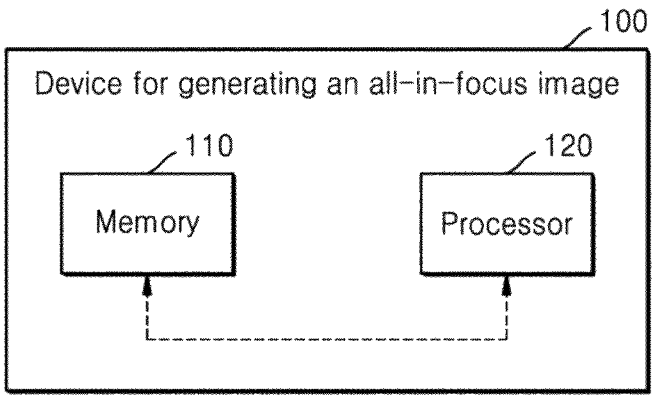
FIG. 1 is a block diagram illustrating a device for generating an all-in-focus image in accordance with some example embodiments.

Throughout the drawings and the some example embodiments, unless otherwise described or provided, the same drawing reference signs will be understood to represent the same elements, features and structures. The drawings may not be proportional, and relative dimensions, proportions and descriptions of elements in the drawings may be exaggerated for clarity, illustration and convenience.

DETAILED DESCRIPTION

The following some example embodiments are provided to assist readers to obtain a comprehensive understanding of the methods, devices and/or systems described herein. However, after understanding the inventive concepts of the present application, various changes, modifications and equivalents of the methods, devices and/or systems described herein will be clear. For example, the order of operations described herein is only an example and is not limited to those described herein, but may be changed as will be clear after understanding the inventive concepts of the present application, except for operations that must be performed in a specific order. In addition, in order to increase clarity and conciseness, the description of features known after understanding the inventive concepts of the present application may be omitted.

It will be understood that an operation that is described herein to be performed "by" performing another operation or sub-operation may be performed "based on" the other operation or sub-operation, such that the operation may be performed based on a set of operations and/or sub-operations that may include the other operation or sub-operation alone or in combination with other operations or sub-operations.

The features described herein may be implemented in different forms and should not be construed as limited to the examples described herein. Instead, the examples described herein have been provided to show only some of many feasible ways to implement the methods, devices and/or systems described herein that will be clear after understanding the inventive concepts of the present application.

FIG. 1 is a block diagram illustrating a device for generating an all-in-focus image in accordance with some example embodiments.

Figure 7:
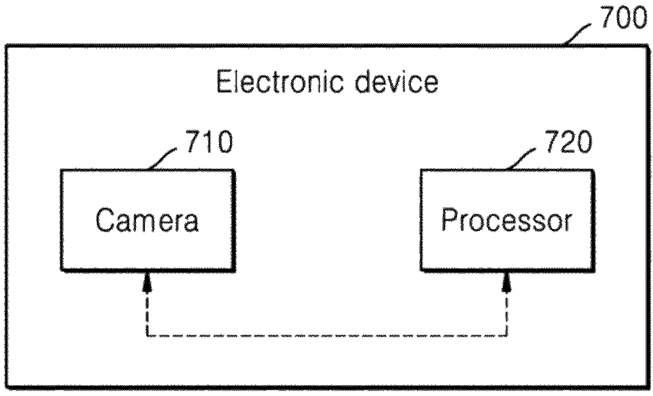
FIG. 7 is a block diagram illustrating an electronic device in accordance with some example embodiments.

Referring to FIG. 1, a device 100 for generating an all-in-focus image may comprise a memory 110 and a processor 120. In some example embodiments, the device 100 may further include a phase detection image sensor (e.g., an internal phase detection image sensor), such as camera 710 that is shown in FIG. 7. However, it will be understood that example embodiments are not limited thereto, and in some example embodiments the phase detection image sensor (e.g., included in camera 710) may be external to the device 100 and thus may not be included as part of the device 100 (e.g., the device 100 may not include any internal phase detection image sensors). For example, the phase detection image sensor may be camera 710 shown in FIG. 7, and the device 100 may be connected with the camera 710 and may include a processor that is the processor 720 of FIG. 7. The camera 710 may be external to the device 100 in a same electronic device 700 or in separate electronic devices that are communicatively coupled to each other. Although it is not illustrated in FIG. 1, the device 100 for generating the all-in-focus image may be connected with an external memory and/or may communicate with an external device (also referred to herein as a remote device). The device 100 for generating the all-in-focus image illustrated in FIG. 1 may comprise components associated with some example embodiments. Thus, it will be apparent for those skilled in the art that the device 100 for generating the all-in-focus image may also comprise other general components except the components illustrated in FIG. 1.

Figure 8:
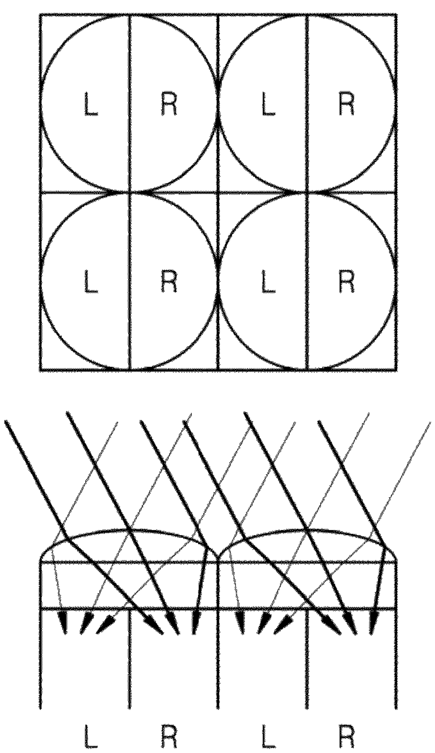
FIG. 8 shows an example pixel structure of a phase detection image sensor.

The phase detection image sensor may have various forms of pixel structures. FIG. 8 shows an example pixel structure of a phase detection image sensor. The pixel structure in FIG. 8 may also be referred to as an all dual pixel structure. Referring to FIG. 8, the left phase detection pixel L may collect light from the right side of a microlens through the microlens, and the right phase detection pixel R may collect light from the left side of the microlens through the microlens. Although FIG. 8 shows an example of a pixel structure of a phase detection image sensor, the inventive concept is not limited thereto, and the phase detection image sensor may also have any other pixel structure including a phase detection pixel.

Here, the device 100 for generating the all-in-focus image may be implemented using various types of devices such as a personal computer (PC), a server device, a mobile device, an embedded device, and the like. Particularly, the device 100 for generating the all-in-focus image may be and/or may be included in smart phones, tablet devices, augmented reality (AR) devices, Internet of things (IoT) devices, autonomous vehicles, robot devices or medical devices that can capture and/or process images, but is not limited to thereto.

The memory 110 stores various data processed in the device 100 for generating the all-in-focus image. For example, the memory 110 may store data that have been processed or will be processed in the device 100 for generating the all-in-focus image. In some example embodiments, the memory may store instructions executable in the processor 120 (e.g., may store executable instructions). In addition, the memory 110 may store applications or drivers that will be driven by the device 100 for generating the all-in-focus image.

For example, the memory 110 may comprise a random access memory (RAM) (such as a dynamic random access memory (DRAM) or a static random access memory (SRAM)), a read only memory (RAM), an electrically erasable programmable read only memory (EEPROM), a CD-ROM, a Blu-ray disc, an optical disc storage device, a hard disc drive (HDD), a solid state drive (SSD), or a flash memory.

The processor 120 may control an overall function of the device 100 for generating the all-in-focus image. For example, the processor 120 may generally control the device 100 for generating the all-in-focus image by performing a program stored in the memory 110 (e.g., executing a program and/or executable instructions stored in the memory 110). The processor 120 may be implemented as a central processing unit (CPU) a graphics processor (CPU) or an application processor (AP) included in the device 100 for processing data, but is not limited thereto. For example, the memory 110 may store executable instructions, and the processor 120 may be configured to execute the executable instructions that are stored in the memory 110 to implement and/or perform any of the functions of the device 100, any of the methods according to any of the example embodiments (e.g., any of the methods for generating the all-in-focus image as described herein), any combination thereof, or the like.

Figure 3:
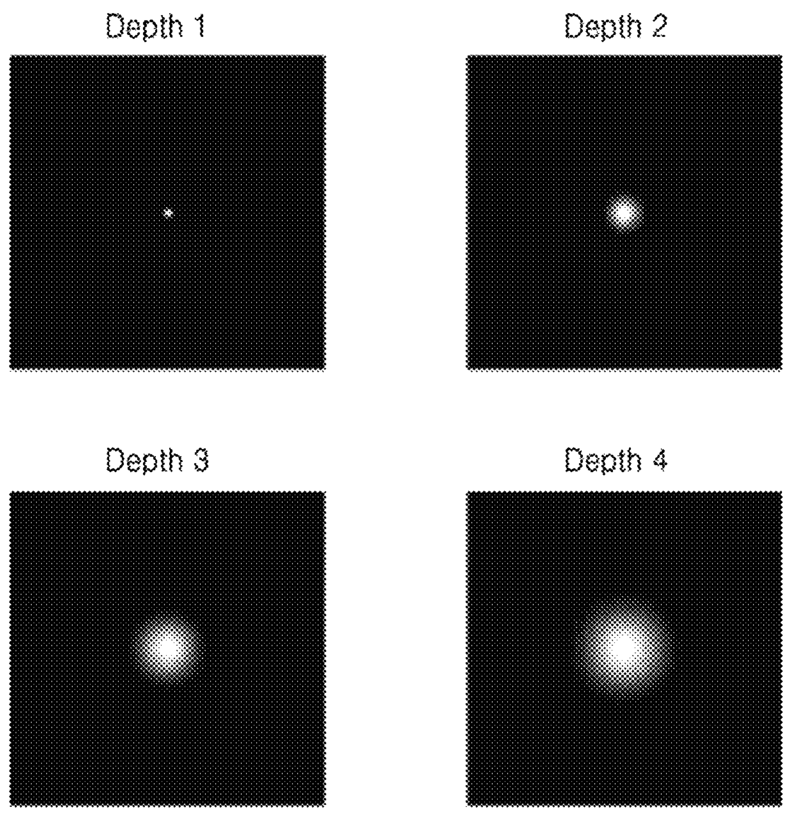
FIG. 3 is an illustrative diagram of a blur kernel after intensity normalization in accordance with some example embodiments.

The processor 120 may read data from the memory 110 (for example, image data such as a scene image and a phase detection image) or write the data to the memory 110 and generate an all-in-focus image by using the read data/written data. For example, when instructions (also referred to herein as executable instructions) are executed in the processor 120, the processor 120 may be configured to obtain a scene image and a phase detection image by capturing a scene using a phase detection image sensor; determine a blur kernel based on the phase detection image and a particular (or, alternatively, pre-established or stored) mapping relationship indicating a depth and a blur kernel distribution; and generate an all-in-focus image by deblurring the scene image using the blur kernel. As described herein, "a depth and a blur kernel distribution" may be understood to refer to a distribution between "depth" (e.g., depth values) and "blur kernel," for example as shown in FIG. 3, such that different depths (e.g., depth values) in the mapping relationship may correspond to (e.g., may be associated with) different blur kernels. According, a given depth may be applied to the distribution of the mapping relationship to determine a particular blur kernel that is associated with (e.g., corresponds to) the given depth in the distribution. Generally, a blur kernel may be understood as a matrix. When the clear image is convoluted with the blur kernel, the clear image will become a blur image. Therefore, in order to obtain the clear image, the blur kernel may be determined, and the determined blur kernel may be used to recover and obtain the clear image from the blur image.

That is to say, the device 100 for generating the all-in-focus image may be capable of generating the all-in-focus image only based on one frame (for example, a scene image and a phase detection image generated based on the one frame) captured using the phase detection image sensor. Thus, the device 100 for generating the all-in-focus image may save the time for generating the all-in-focus image. For example, the device 100 for generating the all-in-focus image may avoid a process of scan-focusing. In addition, the device 100 for generating the all-in-focus image may extend application scenes. For example, the device 100 for generating the all-in-focus image may generate the all-in-focus image for a scene of a moving object.

Accordingly, based on generating the all-in-focus image according to any of the example embodiments (e.g., based on deblurring the scene image using a blur kernel that is determined based on the phase detection image and the particular (or, alternatively, pre-established or stored) mapping relationship indicating the depth and the blur kernel distribution), the device 100 may exhibit improved image-processing performance based on generating the all-in-focus image more quickly. Additionally, based on generating the all-in-focus image according to any of the example embodiments, the device 100 may utilize fewer computing resources (e.g., based on avoiding the process of scan-focusing), thereby improving operational performance of the device 100 and/or improving operational efficiency (e.g., improved speed in generating the all-in-focus image and/or reduced resource consumption to do so), improving resource utilization, and/or reducing power consumption of the device 100. Additionally, as noted above, based on generating the all-in-focus image according to any of the example embodiments, the device 100 may exhibit improved performance based on being configured to extend application scenes (e.g., generating the all-in-focus image for a scene of a moving object). Furthermore, it will be understood that performing a method of generating the all-in-focus image according to any of the example embodiments may provide the above-noted improved results (e.g., generating an all-in-focus image with improved speed, improved operational performance, improved efficiency, reduced resource utilization, reduced power consumption, etc.).

The device 100 may include a display device (e.g., a light emitting diode (LED) or organic LED (OLED) screen), and the processor 120 may be configured to cause the display device to display the generated all-in-focus image, thereby providing the aforementioned benefits of generating the all-in-focus image according to any of the example embodiments to a user supported by the device 100 (e.g., based on the user being provided with the generated all-in-focus image more quickly due to the device 100 generating the all-in-focus image according to any of the example embodiments).

The device 100 may include a wired communication interface and/or wireless network communication transceiver, and the processor 120 may be configured to transmit the generated all-in-focus image to an external device (e.g., remote device) that is external to the device 100 via the transceiver, thereby providing the aforementioned benefits of generating the all-in-focus image according to any of the example embodiments to a user supported by the external device.

In some example embodiments, the device 100 may be included in an electronic device (e.g., electronic device 700 shown in FIG. 7) together with another device that is configured to utilize images as an input to perform an operation (e.g., to navigate the electronic device through an environment).

Hereinafter, an example of generating an all-in-focus image performed by the processor 120 according to some example embodiments will be described with reference to FIGS. 2 to 7.

Figure 2:
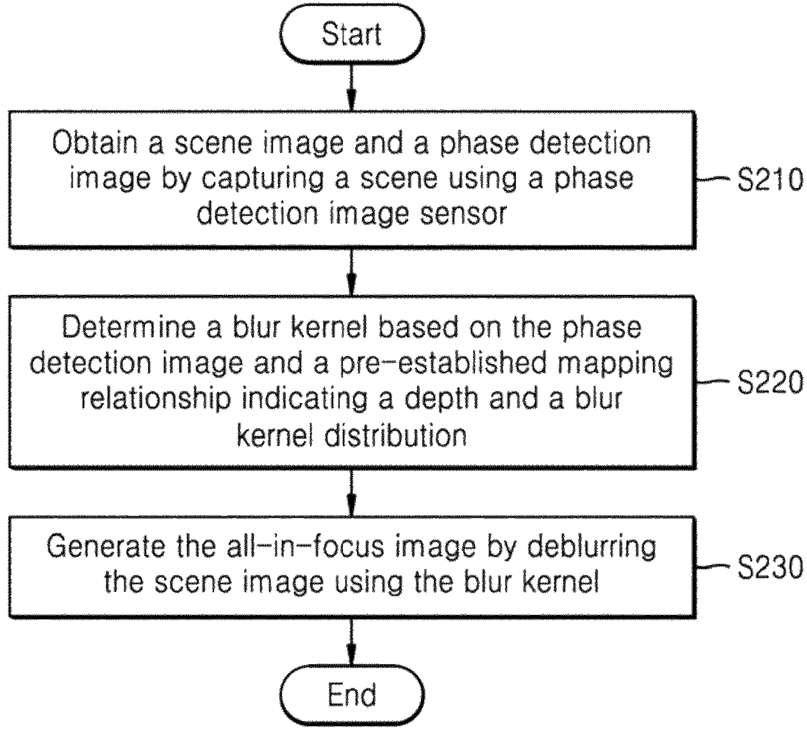
FIG. 2 is a flow diagram illustrating a method of generating an all-in-focus image in accordance with some example embodiments.

FIG. 2 is a flow diagram illustrating a method of generating an all-in-focus image in accordance with some example embodiments. It will be understood that the method shown in FIG. 2 may be implemented by any devices according to any of the example embodiments, including for example the device 100 shown in FIG. 1, for example based on the processor 120 executing executable instructions stored in the memory 110.

Referring to FIG. 2, in operation S210, the processor may obtain a scene image and a phase detection image by capturing a scene using a phase detection image sensor (e.g., based on processor 120 controlling a phase detection image sensor).

The phase detection image sensor may include pixels configured to sense light intensity of incident light, also referred to herein as pixels for sensing light intensity. Here, the scene image may be obtained through (e.g., based on electrical signals generated by) the pixels for sensing light intensity of the phase detection image sensor. As a non-limiting example only, the pixels for sensing light intensity of the phase detection image sensor may be RGB pixels or YUV pixels. However, the pixel(s) for sensing light intensity of the present inventive concepts is not limited to thereof, but may also be other pixels for sensing light intensity. In addition, the phase detection image sensor may include phase detection (PD) pixels, and the phase detection image may be obtained through (e.g., based on electrical signals generated by) phase detection (PD) pixels of the phase detection image sensor.

In some example embodiments, the generation of the scene image and the phase detection image may be performed at a processor inside the phase detection image sensor or a processor outside the phase detection image sensor (for example, the processor 120 in FIG. 1). For example, one frame data generated by capturing a scene using a phase detection image sensor may be converted into a scene image and a phase detection image.

In operation S220, the processor may determine (e.g., select) the blur kernel based on the phase detection image and a particular (or, alternatively, pre-established or stored) mapping relationship indicating a depth and a blur kernel distribution (e.g., a mapping relationship that indicates different depths and further indicates separate, respective blur kernels that correspond to the separate, respective (e.g., different) depths).

Generally, in the process of capturing a scene, an image (e.g., a captured and/or obtained scene image) may be blurred due to various factors (such as object motion, camera jitter, object out of focus, etc.). Image blur is generally considered as a process of a clear image being convoluted with the blur kernel to obtain a blurred image. Thus, the blur kernel may be used to eliminate or reduce the blur of an image.

In some example embodiments, in order to obtain the mapping relationship indicating the depth and the blur kernel, a blur kernel image may be first obtained based on an image of point sources collected by the phase detection image sensor at different depths; and the mapping relationship indicating the depth and the blur kernel distribution is established by interpolating the blur kernel image or fitting the blur kernel image.

For example, assuming that the blur kernel has spatial consistency at a fixed defocus depth, the existing edge method may be used to obtain a blur kernel image at different defocus positions. In principle, the blur kernel may be considered as a blur image after the point light source passes through an imaging system, however, in actual measurement, other indirect measurement methods (such as the edge method) are generally used to measure other images, and then the imaging of the equivalent point light source is obtained through calculation, so as to obtain the blur kernel.

In addition, the method of generating a blur kernel image of the present inventive concepts may not be limited to the edge method and may also be obtained using any other existing method. Blur kernel images at different depths may be obtained through the above method. As an example only, the image of the blur kernel may be as shown in FIG. 3. Then, the blur kernel images at all depths may be obtained by interpolating or fitting the blur kernel images. When blur kernel images at all depths are obtained, the mapping relationship indicating the depth and the blur kernel distribution is established. Thus, when the mapping relationship of the depth and the blur kernel distribution and the depth are known (e.g., the depth is known and the mapping relationship is known), the blur kernel suitable for the deblur of a pixel at a specific depth may be determined (e.g., selected). Although an example of establishing the mapping relationship indicating the depth and the blur kernel distribution is described as above, the present inventive concepts are not limited thereto, and other method may also be used to establish the mapping relationship indicating the depth and the blur kernel distribution.

In addition, the phase detection image may include depth information (e.g., depth values). Thus, a blur kernel may be rapidly determined (e.g., selected) based on the phase detection image and a particular (or, alternatively, pre-established or stored) mapping relationship indicating a depth and a blur kernel distribution, thereby reducing the amount of calculation and saving the calculation time, meanwhile, ensuring the accuracy of the determined blur kernel and reducing operation time, improving operation speed, improving operation efficiency, reducing computing resource utilization, reducing power consumption and/or processing time to perform the method of generating the all-in-focus image according to any of the example embodiments, any combination thereof, or the like. The mapping relationship, and a plurality of blur kernels corresponding to depths in the mapping relationship, may be stored in memory 110. A blur kernel may be determined based on applying depth information to the mapping relationship, and the determined blur kernel may be selected from the plurality of blur kernels.

The method of determining the blur kernel will be described in more detail later in conjunction with FIGS. 4 and 6.

In operation S230, the processor may generate an all-in-focus image by deblurring the scene image using the blur kernel (e.g., the blur kernel that is determined (e.g., selected) at S220).

In some example embodiments, the processor may deblur the scene image by applying the blur kernel to a particular (or, alternatively, predetermined) blur kernel convolution model to generate the all-in-focus image.

As an example only, the particular (or, alternatively, predetermined) blur kernel convolution model may include a typical blur kernel convolution model. Solving the deblurring process may be considered as the process of optimizing the target function. For example, a deblurring model with L2 regular term may be expressed by Equation (1) and solved in combination with Equation (2):

$$I_{all}^{*} = \mathrm{argmin}_{D_R, I_{all}} \|K(x, y, D_R) * I_{all}(x, y) - I(x, y)\|^2 + \gamma\|\nabla I_{all}(x, y)\|_2^2 + \eta\|\nabla K(x, y, D_R)\|_2^2 \quad \text{Equation (1)}$$

-continued

Equation (2)

$$K(x, y, D_R) * I_{all}(x, y) = \iint K(x-\alpha, y-\beta, D_R(\alpha, \beta)) I_{all}(\alpha, \beta) d\alpha d\beta$$

In the above Equations (1) and (2), $$I_{all}^{*}$$

may represent a deblurred all-in-focus image (i.e., an optimal solution of an all-in-focus image), $I_{all}(x, y)$ represent an all-in-focus image (i.e., all possible solutions of the all-in-focus image), $D_R$ may represent a depth image having the same resolution as that of the scene image, $K(x, y, D_R)$ may represent a blur kernel when indicating that a depth is $D_R$, x may represent the abscissa of a pixel in the image, y may represent the ordinate of a pixel in the image, $I(x, y)$ may represent a scene image, $\nabla$ may represent a gradient, $\gamma$ may represent an adjustable regularity coefficient and $\eta$ may represent an adjustable regularity coefficient.

In one example, the deblurring may be solved by a variational method. Solving defuzzification may be regarded as the problem of determining the extreme value of a functional, and may be performed by solving Euler Lagrange equation.

For example, design the following functional:

$$J(I_{all}, D_R) = \|K(x, y, D_R) * I_{all}(x, y) - I(x, y)\|^2 + \gamma\|\nabla I_{all}(x, y)\|_2^2 + \eta\|\nabla K(x, y, D_R)\|_2^2$$

The extreme value of the above functional can be solved by the following steps, where the initial value of $D_R$ is the depth distribution obtained by phase detection pixels, the initial value of $I_{all}$ is the pixel value distribution obtained by the pixels of sensing light intensity:

Step 1: Solve $$\frac{\partial J}{\partial I_{all}}$$

in the Euler Lagrange equation to solve and obtain $$I_{all}^{(n+1)}$$

by $$I_{all}^{(n)};$$

Step 2: Solve $$\frac{\partial J}{\partial D_R}$$

in the Euler Lagrange equation to solve and obtain $$D_R^{(n+1)}$$

by $$D_R^{(n)};$$

and

Step 3: Repeat steps 2 and 3 until the functional $J(I_{all}, D_R)$ converges.

The solution when functional $J(I_{all}, D_R)$ converges may correspond to the deblurred all-in-focus image.

Although a typical blur kernel convolution model is shown as above, the present inventive concepts is not limited thereto, and the particular (or, alternatively, predetermined) blur kernel convolution model may also be any other blur kernel convolution model.

Since the blur kernel may be rapidly determined (e.g., selected) and applied to the particular (or, alternatively, predetermined) blur kernel convolution model, the time-consuming and uncertain effect in the deblurring process may be improved, thereby improving performance (e.g., accuracy, speed), efficiency (e.g., reduced resource and/or power consumption), or the like in association with generating the all-in-focus image. Besides, according to the characteristics of the phase detection image sensor (for example, the resolution of a PD image is relatively high) and the requirements of the final image effect, an initial value of the blur kernel may be kept unchanged and only $I_{all}(x, y)$ is optimized.

FIG. 3 is an illustrative diagram of a blur kernel after intensity normalization in accordance with some example embodiments.

In FIG. 3, different depths may correspond to different blur kernels. For example, depth 1 may correspond to a first blur kernel, depth 2 may correspond to a second blur kernel, depth 3 may correspond to a third blur kernel, and depth 4 may correspond to a fourth blur kernel. Here, the intensity of the blur kernel in FIG. 3 is normalized. Note that although FIG. 3 illustrates an example of a blur kernel after intensity normalization, the blur kernel of the present inventive concepts is not limited to thereto, and may also have other forms. Accordingly, a depth and a blur kernel distribution as described herein may refer to a distribution of depths and blur kernels, wherein different depths may correspond to different blur kernels.

Figure 4:
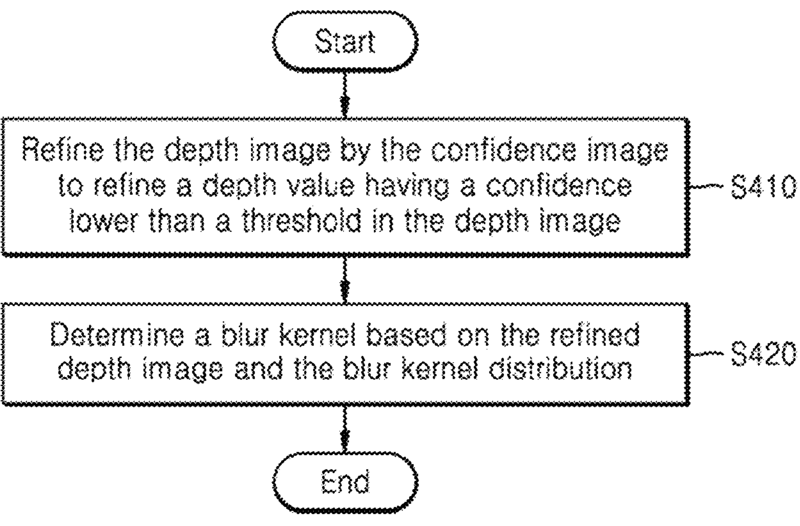
FIG. 4 is a flow diagram illustrating a method of determining the blur kernel based on a phase detection image in accordance with some example embodiments.

FIG. 4 is a flow diagram illustrating a method of determining (e.g., selecting) a blur kernel in accordance with some example embodiments. It will be understood that the method shown in FIG. 4 may be implemented by any devices according to any of the example embodiments, including for example the device 100 shown in FIG. 1, for example based on the processor 120 executing executable instructions stored in the memory 110. The method shown in FIG. 4 may be performed as part of performing operation S220 shown in FIG. 2.

In some example embodiments, the phase detection image (e.g., obtained at S210 in the method shown in FIG. 2) includes a depth image and a confidence image corresponding to the depth image.

In operation S410, the processor may refine the depth image through the confidence image to refine a depth value having a confidence lower than a threshold in the depth image.

Here, the depth image and the confidence image corresponding to the depth image may be obtained by using the existing method based on the original data output of PD pixels. For the depth image D and the corresponding confidence image C, the confidence may represent the credibility degree of a depth. For example, if the confidence is 0, it represents that the calculated depth is completely untrusted, and if the confidence is 1, the calculated depth is accurate. Each depth pixel D (x, y) corresponds to a confidence C (x, y), wherein x may represent the abscissa of the depth image, and y may represent the ordinate of the depth image. The calculation process of the depth image and the confidence image corresponding to the depth image may be carried out on the processor of the phase detection image sensor or also on the processor (e.g., an application processor) of the terminal (e.g., a mobile phone).

In some example embodiments, the processor may refine pixel points with a low confidence in the depth image by using the bad point removing process of the image, and therefore, the data in the depth image may be refined accurately. For example, the processor may refine the depth image through the following Equation (3):

$$D_r(x,y)=w(C(x,y))\times D(x,y)+(1-w(C(x,y)))\times f(D(x',y')) \quad \text{Equation (3)}$$

In Equation (3), Dr (x, y) may represent the refined depth image, (x', y') is a neighborhood pixel of (x, y) (for example, only as an example, if a 3×3 pixel area is selected, the center point is (x, y), and surrounding 8 points are the neighborhood pixels (x', y')), D (x, y) is the depth image before refining, and C (x, y) is the confidence image corresponding to the depth image.

Figure 5:
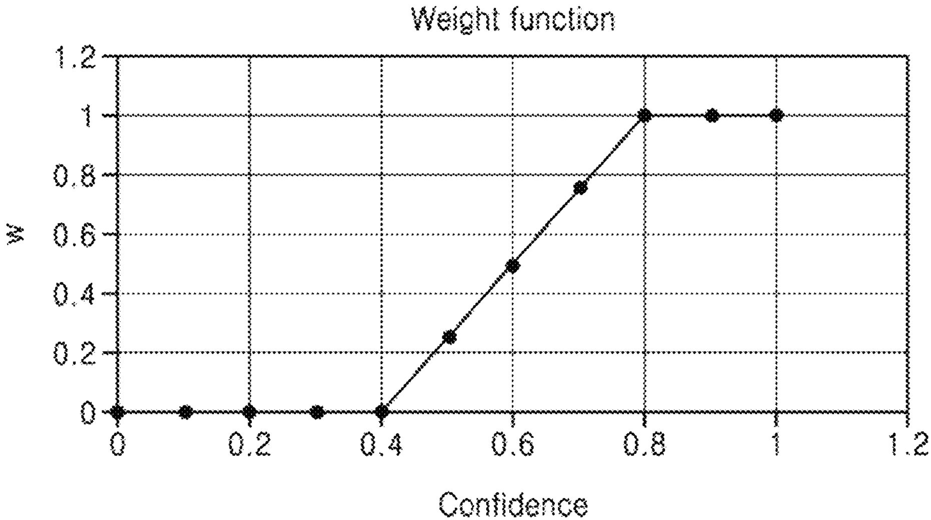
FIG. 5 is an illustrative diagram of a weight function in accordance with some example embodiments.

In addition, w ( ) may be a weight function based on the confidence. FIG. 5 is an illustrative diagram of a weight function in accordance with some example embodiments. A weight function w ( ) is a function that may be adjusted, and the greater the confidence, the greater the weight. For example, w ( ) may be a piecewise linear function as shown in FIG. 5. However, w ( ) shown in FIG. 5 is only an example, and the present inventive concepts is not limited thereto.

f ( ) may be a refining function for performing the bad point removing process of the image. For example, the bad point removing process may include using the mean filtering of the surrounding 8 points of the pixel point. However, the mean filtering is only an example, and the bad point removing process of the present inventive concepts is not limited to the mean filtering, but may also include other bad point removing processes.

In operation S420, the processor determines (e.g., selects) a blur kernel based on the refined depth image and a particular (or, alternatively, pre-established or stored) mapping relationship indicating a depth and a blur kernel distribution (e.g., a distribution indicating separate, or different blur kernels corresponding to separate, respective depths).

The processor may obtain depth information (e.g., a depth) from the refined depth image. Thus, the processor may determine a blur kernel corresponding to the depth information based on the depth information and a particular (or, alternatively, pre-established or stored) mapping relationship indicating a depth and a blur kernel distribution. In some example embodiments, the mapping relationship indicating a depth and a blur kernel distribution here may refer to the mapping relationship indicating a depth and a blur kernel distribution described in FIG. 3.

In some example embodiments, a mapping relationship indicating a distribution of depth and blur kernel may be developed empirically and may be stored as a database, such as a look-up table that associates depth values with corresponding blur kernels. The corresponding blur kernels may be stored in the database or may be stored separately in a separate database. Accordingly, determining a blur kernel may include accessing the look-up table and applying a depth (e.g., depth value) to the look-up table to determine and/or select a corresponding blur kernel that is associated with the applied depth in the look-up table.

Since the blur kernel may be determined using more accurate depth information obtained by the refined depth image, the blur kernel is determined more accurately.

Operation S420 is described in more detail below in conjunction with FIG. 6.

Figure 6:
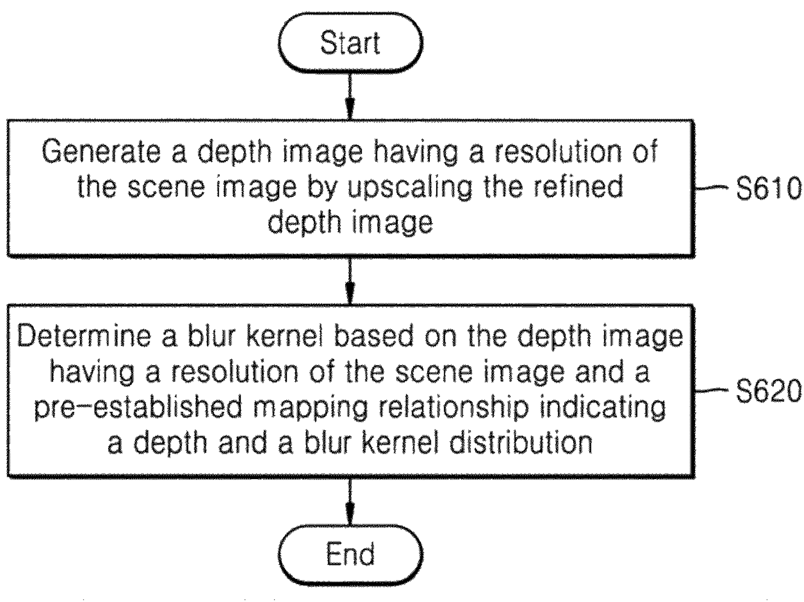
FIG. 6 is a flow diagram illustrating a method of determining the blur kernel based on a refined depth image in accordance with some example embodiments.

FIG. 6 is a flow diagram illustrating a method of determining a blur kernel in accordance with some example embodiments. It will be understood that the method shown in FIG. 6 may be implemented by any devices according to any of the example embodiments, including for example the device 100 shown in FIG. 1, for example based on the processor 120 executing executable instructions stored in the memory 110.

Referring to FIG. 6, in operation S610, the processor may generate a depth image having a resolution of the scene image by upscaling the refined depth image.

In the phase detection image sensor, a resolution of pixels for sensing light intensity is generally different from that of PD pixels. That is to say, the resolution of the scene image may be different from the resolution of the depth image. Thus, in order to implement better matching between the scene image and the depth image, the processor may generate a depth image having a resolution of the scene image by upscaling the refined depth image using an upscaling algorithm.

In some example embodiments, the upscaling algorithm may be a super division algorithm (e.g., a bicubic interpolation algorithm). In another example, the upscaling algorithm may be an upscaling algorithm that uses the scene image as reference information for upscaling (for example, a guided filtering algorithm with edge preserving effect). However, the present inventive concepts are not limited to thereto, and the upscaling algorithm may also be any other sampling algorithm.

In operation S620, the processor may determine the blur kernel based on the depth image having a resolution of the scene image and a particular (or, alternatively, pre-established or stored) mapping relationship indicating a depth and a blur kernel distribution.

The processor may obtain depth information (e.g., a depth, depth value, or the like) from the depth image having a resolution of the scene image. Thus, the processor may determine the blur kernel corresponding to the depth information based on the depth information and a particular (or, alternatively, pre-established or stored) mapping relationship (e.g., a look-up table) indicating a depth and a blur kernel distribution. In addition, since the depth information obtained from the depth image having a resolution of the scene image may match with the scene image, the blur kernel may be determined directly using the depth information and the mapping relationship indicating a depth and a blur kernel distribution without additional processing. In some example embodiments, the mapping relationship indicating a depth and a blur kernel distribution here may refer to the mapping relationship indicating a depth and a blur kernel distribution described in FIG. 3.

Since the blur kernel may be determined directly using the depth information and the mapping relationship indicating a depth and a blur kernel distribution without additional processing, the calculation time is reduced, thereby improving operational performance, operational efficiency, etc. of a device performing the method.

FIG. 7 is a block diagram illustrating an electronic device in accordance with some example embodiments.

Referring FIG. 7, an electronic device 700 may include a camera 710 and a processor 720. For example, the electronic device 700 may be applied to or installed in robot devices (such as an unmanned aircraft and an advanced driver assistance system (ADAS), smart TVs, smart phones, medical devices, mobile devices, image display devices, measurement devices, IoT devices, and any other various types of electronic devices.

The camera 710 may include a phase detection image sensor and may be configured to capture (e.g., obtain) images (e.g., scene images). The processor 720 may perform operations similar to those performed by the processor 120 described with reference to FIG. 1. For example, the processor 720 may obtain a scene image and a phase detection image by capturing a scene using a phase detection image sensor; determine a blur kernel based on the phase detection image and a particular (or, alternatively, pre-established or stored) mapping relationship indicating a depth and a blur kernel distribution; and generate an all-in-focus image by deblurring the scene image using the blur kernel. For example, in some example embodiments, the electronic device 700 may include the device 100 shown in FIG. 1, where processor 720 may be the processor 120 of the device 100. Camera 710 may be external to device 100 within the electronic device 700, such that camera 710 and device 100 are separate devices included within the electronic device 700 and communicatively coupled therebetween within the electronic device 700, where device 100 may not include any internal phase detection image sensors. In some example embodiments, camera 710 may be internal to device 100 within the electronic device 700.

One or more of the methods described above may be written as a program executable on a computer (e.g., as executable instructions) and may be implemented on a universal digital computer operating the program by using a non-transient (e.g., non-transitory) computer-readable recording medium. Various devices may be used to record the structure of the data used in the above method on a computer-readable recording medium. The computer-readable recording medium may include a storage medium (e.g., memory), such as a magnetic storage medium (e.g., a ROM, a RAM, a Universal Serial Bus (USB), a floppy disk, a hard disk, etc.), an optical recording medium (e.g., an optical disc (CD)-ROM, a digital universal optical disc (DVD), etc.), and the like.

According to some example embodiments, the device for generating the all-in-focus image may be capable of generating the all-in-focus image only based on one frame (for example, a scene image and a phase detection image generated based on the one frame) captured using the phase detection image sensor. Thus, the device for generating the all-in-focus image may save the time for generating the all-in-focus image, thereby exhibiting improved operational performance, improved operational efficiency, or the like based on generating the all-in-focus image according to any of the methods of any of the example embodiments. For example, the device for generating the all-in-focus image may avoid a process of scan-focusing, thereby reducing operation time, reducing consumption of power, reducing use of computing resources, any combination thereof, or the like in generating the all-in-focus image. In addition, the device for generating the all-in-focus image may extend application scenes. For example, the device 100 for generating the all-in-focus image may generate the all-in-focus image for a scene of a moving object.

According to some example embodiments, a blur kernel may be rapidly determined based on the phase detection image including depth information and a particular (or, alternatively, pre-established or stored) mapping relationship indicating a depth and a blur kernel distribution, thereby reducing the amount of calculation and saving the calculation time, meanwhile, ensuring the accuracy of the determined blur kernel, which may improve operational performance, operational efficiency, etc. associated with a device implementing the methods for generating an all-in-focus image according to any of the example embodiments.

According to some example embodiments, since the blur kernel may be rapidly determined and applied to the particular (or, alternatively, predetermined) blur kernel convolution model, the time-consuming and uncertain effect in the deblurring process may be improved, which may improve operational performance, operational efficiency, etc. associated with a device implementing the methods for generating an all-in-focus image according to any of the example embodiments.

According to some example embodiments, since the blur kernel may be determined using more accurate depth information obtained from the refined depth image, the blur kernel is determined more accurately, which may improve operational performance, operational efficiency, etc. associated with a device implementing the methods for generating an all-in-focus image according to any of the example embodiments.

According to some example embodiments, the refined depth image may be upscaled by using the upscaling algorithm to generate a depth image having a resolution of the scene image, so as to achieve better matching between the scene image and the depth image, which may improve operational performance, operational efficiency, etc. associated with a device implementing the methods for generating an all-in-focus image according to any of the example embodiments.

According to some example embodiments, since the depth information obtained from the depth image having a resolution of the scene image may match with the scene image, the blur kernel may be determined directly using the depth information and the mapping relationship indicating the depth and the blur kernel distribution without additional processing, which may improve operational performance, operational efficiency, etc. associated with a device implementing the methods for generating an all-in-focus image according to any of the example embodiments. Since the blur kernel may be determined directly using the depth information and the mapping relationship indicating a depth and a blur kernel distribution without additional processing, the calculation time is reduced, which may improve operational performance, operational efficiency, etc. associated with a device implementing the methods for generating an all-in-focus image according to any of the example embodiments.

In some example embodiments, electronic device 700 may be a vehicle, such as an automobile, an autonomous vehicle, a drone vehicle, or the like and may include processor 720 (and may further include memory 110 shown in FIG. 1 and thus may include device 100) and an ADAS. The processor 120 and/or device 100 of electronic device 700 may communicate generated all-in-focus images to the ADAS, and the ADAS may perform navigation of the electronic device 700 through an environment (which may include controlling driving of the electronic device 700) based on processing the all-in-focus image. Such navigation may include controlling driving elements of the electronic device 700, including vehicle steering controls, throttle controls, brake controls, etc. Accordingly, based on the processor 120/device 100 generating an all-in-focus image according to any of the example embodiments to have improved accuracy and improved generation speed as described herein, the ADAS may perform navigation of the electronic device 700 with improved accuracy and improved response time, thereby enabling electronic device 700 to navigate through an environment with improved confidence, improved safety, etc.

As conventional in the art, some example embodiments may be described and illustrated in accordance with a frame that performs one or more of the described functions. These blocks, which may be referred to herein as units or modules, etc., are physically implemented by analog and/or digital circuits (such as logic gates, integrated circuits, microprocessors, microcontrollers, memory circuits, passive electronic components, active electronic components, optical components, hardwired circuits, etc.) and may optionally be driven by firmware and/or software. For example, the circuit may be implemented in one or more semiconductor chips or on a substrate support, such as a printed circuit board and the like. The circuits that make up the blocks may be implemented by dedicated hardware, or by a processor (e.g., one or more programmed microprocessors and associated circuits), or by a combination of dedicated hardware that performs some functions of the blocks and a processor that performs other functions of the blocks. Without departing from the scope of the present inventive concepts, each block of some example embodiments may be physically divided into two or more interacting and discrete blocks. Similarly, the frames of some example embodiments may be physically combined into more complex frames without departing from the scope of the present inventive concepts. One aspect of some example embodiments may be implemented by instructions stored in a non-transient storage medium (e.g., a solid-state drive (SSD) memory) and executed by a processor (e.g., a central processing unit (CPU).

As described herein, any devices, systems, blocks modules, units, controllers, circuits, and/or portions thereof according to any of the example embodiments (including, without limitation, device 100, memory 110, processor 120, electronic device 700, camera 710, processor 720, or the like) may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a solid state drive (SSD), storing a program of instructions, and a processor (e.g., CPU) configured to execute the program of instructions to implement the functionality and/or methods performed by some or all of any devices, systems, blocks modules, units, controllers, circuits, and/or portions thereof according to any of the example embodiments, and/or any portions thereof.

Even if the present inventive concepts include specific examples, it will be clear after comprehending the inventive concepts of the present application, various changes in form and details in these examples may be made without departing from the spirit and scope of the claims and their equivalents. The examples described herein should be considered descriptive only and not for restrictive purposes. The description of features or aspects in each example will be considered applicable to similar features or aspects in other examples. Appropriate results may be achieved if the described techniques are performed in different orders, and/or if the components in the described system, architecture, device or circuit are combined in different ways, and/or replaced or supplemented by other components or their equivalents. Therefore, the scope of the inventive concepts is not defined by the specific example embodiments described above, but by the claims and their equivalents, and all changes within the scope of the claims and their equivalents should be interpreted as included in the inventive concepts.

What is claimed is:

1. A method of generating an all-in-focus image, the method comprising:

obtaining a scene image and a phase detection image based on capturing a scene using a phase detection image sensor;

determining a blur kernel based on the phase detection image and a mapping relationship, the mapping relationship indicating a depth and a blur kernel distribution;

and generating the all-in-focus image based on deblurring the scene image using the blur kernel, wherein the phase detection image includes a depth image, the depth image including a plurality of depth values corresponding to a plurality of depth pixels, each depth value of the plurality of depth values corresponding to a different depth pixel of the plurality of depth pixels, and a confidence image, the confidence image including a plurality of confidence values, each confidence value of the plurality of confidence values corresponds to a different depth value of the plurality of depth values and indicates a credibility of the different depth value, and wherein the determining the blur kernel based on the phase detection image and the mapping relationship includes refining the depth image to a refined depth image, the refining including adjusting a separate depth value of the plurality of depth values to a separate refined depth value based on a corresponding confidence value of the plurality of confidence values that corresponds to the separate depth value being lower than a threshold value, determining the blur kernel based on applying the refined depth image to the mapping relationship, wherein the all-in-focus image is generated based on only one frame, and wherein the separate refined depth value is equal to the separate depth value in response to the corresponding confidence value being greater than the threshold value.

2. The method of claim 1, wherein the scene image is obtained by pixels for sensing light intensity of the phase detection image sensor, and the phase detection image is obtained by phase detection pixels of the phase detection image sensor.

3. The method of claim 1, wherein the determining the blur kernel based on applying the refined depth image to the mapping relationship comprises:

generating an upscaled depth image having a resolution of the scene image based on upscaling the refined depth image; and determining the blur kernel based on the upscaled depth image having the resolution of the scene image and the mapping relationship.

4. The method of claim 1, wherein the generating the all-in-focus image comprises:

deblurring the scene image based on applying the blur kernel to a blur kernel convolution model to generate the all-in-focus image.

5. The method of claim 1, wherein the mapping relationship is established based on:

obtaining blur kernel images based on images of a point source collected by the phase detection image sensor at different depths; and establishing the mapping relationship indicating the depth and the blur kernel distribution based on interpolating the blur kernel images or fitting the blur kernel images.

6. The method of claim 1, wherein the separate refined depth value is a function of the corresponding confidence value.

7. A device for generating an all-in-focus image, the device comprising:

a memory storing executable instructions;

and a processor that is configured to execute the executable instructions to cause the processor to obtain a scene image and a phase detection image based on capturing a scene using a phase detection image sensor, determine a blur kernel based on the phase detection image and a mapping relationship, the mapping relationship indicating a depth and a blur kernel distribution, and generate the all-in-focus image based on deblurring the scene image using the blur kernel, wherein the phase detection image includes a depth image, the depth image including a plurality of depth values corresponding to a plurality of depth pixels, each depth value of the plurality of depth values corresponding to a different depth pixel of the plurality of depth pixels, and a confidence image, the confidence image including a plurality of confidence values, each confidence value of the plurality of confidence values corresponds to a different depth value of the plurality of depth values and indicates a credibility of the different depth value, wherein the processor is configured to determine the blur kernel based on the phase detection image and the mapping relationship, including refining the depth image to a refined depth image, the refining including adjusting a separate depth value of the plurality of depth values to a separate refined depth value based on a corresponding confidence value of the plurality of confidence values that corresponds to the separate depth value being lower than a threshold value, and determining the blur kernel based on applying the refined depth image to the mapping relationship, wherein the all-in-focus image is generated based on only one frame, and wherein the separate refined depth value is equal to the separate depth value in response to the corresponding confidence value being greater than the threshold value.

8. The device of claim 7, wherein the scene image is obtained by pixels for sensing light intensity of the phase detection image sensor, and the phase detection image is obtained by phase detection pixels of the phase detection image sensor.

9. The device of claim 7, wherein the processor is further configured to execute the executable instructions to generate an upscaled depth image having a resolution of the scene image based on upscaling the refined depth image; and determine the blur kernel based on the upscaled depth image having the resolution of the scene image and the mapping relationship.

10. The device of claim 7, wherein the processor is further configured to execute the executable instructions to deblur the scene image based on applying the blur kernel to a blur kernel convolution model to generate the all-in-focus image.

11. The device of claim 7, wherein the mapping relationship is established based on:

obtaining blur kernel images based on images of a point source collected by the phase detection image sensor at different depths; and establishing the mapping relationship indicating the depth and the blur kernel distribution based on interpolating the blur kernel images or fitting the blur kernel images.

12. The device of claim 7, wherein the separate refined depth value is a function of the corresponding confidence value.

* * * * *